(12) United States Patent
Hong (10) Patent No.: US 7,067,218 B2
(45) Date of Patent: Jun. 27, 2006

(54) METHOD FOR TREATING ELECTRODE TABS OF CRUDE CELL FOR LITHIUM SECONDARY BATTERY, AND CRUDE CELL AND LITHIUM SECONDARY BATTERY ACCORDING TO THE METHOD

(75) Inventor: Ji-Jun Hong, Chungcheongnam-do (KR)

(73) Assignee: Kokam Co., Ltd., Kyounggi-Do (KR)

( * ) Notice: Subject to any disclaimer, the term of this patent is extended or adjusted under 35 U.S.C. 154(b) by 334 days.

(21) Appl. No.: 10/446,272

(22) Filed: May 23, 2003

(65) Prior Publication Data
US 2003/0232243 A1   Dec. 18, 2003

(30) Foreign Application Priority Data
Jun. 12, 2002   (KR) ...................... 10-2002-0032762

(51) Int. Cl.
*H01M 4/64* (2006.01)
(52) U.S. Cl. ...................... 429/233; 429/244; 429/247
(58) Field of Classification Search ................ 429/233, 429/244, 247
See application file for complete search history.

(56) References Cited

U.S. PATENT DOCUMENTS

| 6,371,997 | B1 | 4/2002 | Chang | |
| 2001/0049054 | A1* | 12/2001 | Enomoto et al. | 429/158 |
| 2003/0099880 | A1* | 5/2003 | Park et al. | 429/211 |
| 2005/0132562 | A1* | 6/2005 | Saito et al. | 29/623.5 |

FOREIGN PATENT DOCUMENTS

| EP | 1202371 A1 | 5/2002 |
| JP | 2000315524 | 11/2000 |
| JP | 2002-075324 | 3/2002 |
| JP | 2003257409 | 9/2003 |
| WO | WO 97/33326 | 9/1997 |

OTHER PUBLICATIONS

Search Report in corresponding European Patent Application, dated Feb. 18, 2004, 2 pages.

\* cited by examiner

*Primary Examiner*—Dah-Wei Yuan
(74) *Attorney, Agent, or Firm*—Baker & Daniels LLP (57) ABSTRACT

A method for treating electrode tabs of a crude cell for a lithium secondary battery, crude cell for a lithium secondary battery manufactured according to the method, and a lithium secondary battery employing the crude cell are disclosed. The method for treating electrode tabs of a crude cell provided with a plurality of anode plates having respective anode grids, a plurality of anode plates having respective anode grids, and a separator strip interposed, in a fold/fold manner, between the anode plates and the cathode plates which are disposed alternately, includes the steps of: (a) gathering the anode grids and the cathode grids, respectively, so that the grids can be close to a first surface and be substantially parallel to the first surface, and cutting the end portions of the anode grids and the cathode grids so that the anode grids and the cathode grids can have the shortest length required for being welded to respective tab members; (b) welding an anode tab member and a cathode tab member to respective end portions of the anode grids and the cathode grids to form an anode side welded portion and a cathode side welded portion having lengths as short as possible; (c) attaching insulating tape to the anode side welded portion and the cathode side welded portion so that the insulating tape can wrap the welded portions; (d) bending the anode grids and the cathode grids at respective first bend portions so that the grids can be close to a second surface which is opposite to the first surface, and be substantially perpendicular to the second surface; (e) bending the respective tab members at respective second bend portions so that the tab members can be close to the respective first bend portion, and be substantially parallel to the first surface.

8 Claims, 10 Drawing Sheets

METHOD FOR TREATING ELECTRODE TABS OF CRUDE CELL FOR LITHIUM SECONDARY BATTERY, AND CRUDE CELL AND LITHIUM SECONDARY BATTERY ACCORDING TO THE METHOD

This application claims the benefit of Korean Patent Application Number 10-2002-0032762 filed Jun. 12, 2002, the complete disclosure of which is hereby expressly incorporated by reference.

BACKGROUND OF THE INVENTION

1. Field of the Invention

The present invention relates to a lithium secondary battery, and more particularly, to a method for treating electrode tabs of a crude cell for a lithium secondary battery, in which the capacity of the battery can be increased by increasing the length of electrode members without changing the predetermined specification of a battery package member, and stability of portions of electrode tabs where the tabs are welded to grids, respectively, can be enhanced by using insulation tap, and a crude cell for a lithium secondary battery manufactured according to the method and a lithium secondary battery employing the crude cell.

2. Description of the Related Art

In general, since portable electronic appliances such as a video camera, a portable phone, and a portable PC become lighter in weight and are designed to do various functions, various research and development concerning a battery used as an electric source of such electronic appliances have been performed. Such a battery is usually made to be rechargeable and can be used continuously.

Usually, among batteries, a nickel cadmium battery, nickel hydrogen battery, nickel zinc battery, lithium secondary battery, or the like is used as an electric power source of electronic appliances, and the lithium secondary battery of those batteries is generally used in consideration of its life time and capacity.

According to the type of electrolyte, the lithium secondary battery can be classified into a lithium metal battery and a lithium ion battery, which employ a liquid electrolyte, and a lithium polymer battery, which employs a polymer solid electrolyte. According to the type of polymer solid electrolyte, the lithium polymer battery can be classified into a full-solid type lithium polymer battery, which does not contain an organic electrolyte, and a lithium ion polymer battery, which employs a gel type electrolyte containing organic electrolyte liquid.

Figure 1:
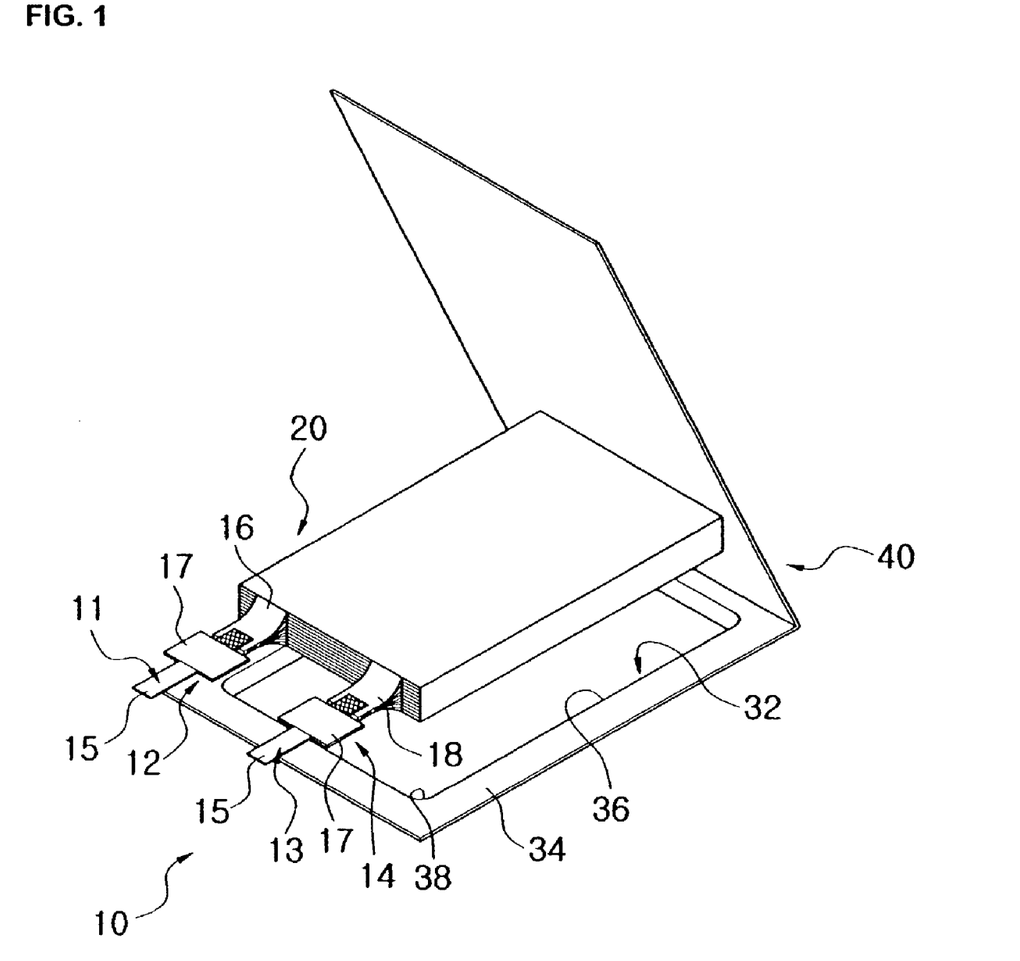
FIG. 1 is a perspective view schematically illustrating a conventional lithium secondary battery.

FIG. 1 is a perspective view schematically illustrating a structure of a conventional lithium secondary battery.

Referring to FIG. 1, the lithium secondary battery 10 comprises a crude cell 20 and a package member 40 for receiving the crude cell 20.

Figure 2A:
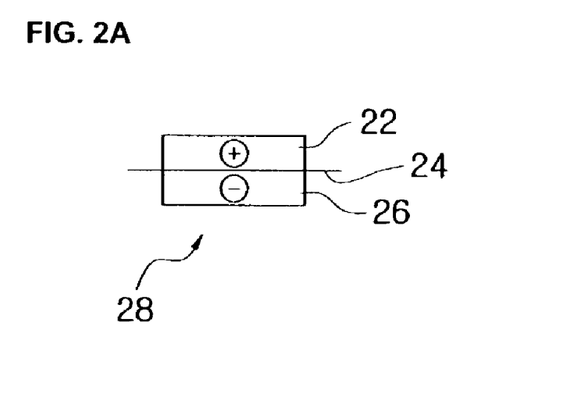
FIG. 2A is a diagram schematically illustrating a structure of a unit cell of a conventional lithium secondary battery.
Figure 2B:
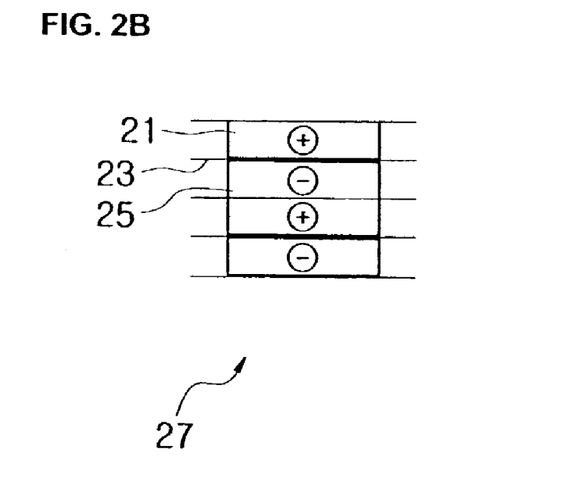
FIG. 2B is a diagram schematically illustrating a structure of a bi-cell of a conventional lithium secondary battery.

The crude cell 20 has a structure stacked with a plurality of unit cells 28 or bi-cells 27 according to a capacity of a battery. Here, as shown in FIG. 2A, each unit cell 28 is composed of an anode plate 22, a separator 24, and a cathode plate 26 in sequence, and as shown in FIG. 2B, each bi-cell 27 is composed of an anode plate 21, a separator 23, a cathode plate 25, a separator 23, and a cathode plate 25 in sequence.

As shown in FIG. 1, the crude cell 20 includes an anode tab 12 and a cathode tab 14. The anode tab 12 is formed by gathering anode grids 16 provided at respective anode plates and joining the anode grids 16 to an anode tab member 11 by welding. The cathode tab 14 is formed by gathering cathode grids 18 provided at respective cathode plates and joining the cathode grids 18 to a cathode tab member 13 by welding. The tab members 11 and 13 are provided with resin members 17 adhered to non-resin members 15 made of aluminum or nickel, respectively.

Figure 3:
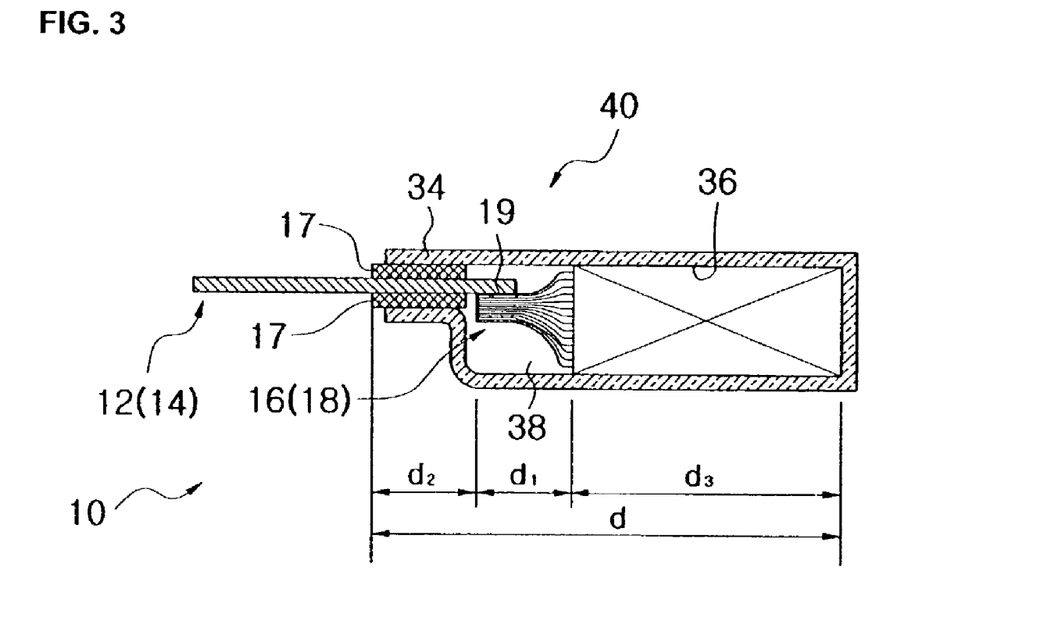
FIG. 3 is a section view schematically illustrating a structure of a conventional lithium secondary battery.

As shown in FIGS. 1 and 3, the package member 40 is provided with a receiving portion 32 into which the crude cell 20 is received and a sealing portion 34 which is hermetically sealed after the receiving portion 32 is filled with an electrolyte. The receiving portion 32 is composed of a first receiving portion 36 into which the anode and cathode plates are substantially received, and a second receiving portion 38 into which anode and cathode tabs 16 and 18 are received. The resin members 17 are interposed between the sealing portions 34, prevent the electrolyte (not shown) from leaking out, and prevent possible short circuit in the region of the tab members 11 and 13.

As shown in FIG. 3, in the structure of the conventional lithium secondary battery 10, when the width of the battery, and the thickness of the battery, i.e., the number of electrode plates are assumed to be the same as those of the other one, the capacity of the battery depends on the length of the battery, in particular, the length of electrode plates which contains an electrode material. Therefore, in order to increase the capacity of the battery, there is a method of increasing the length d3 of the first receiving portion 36 by decreasing the length d1 or length d2 of the whole length d of the battery, i.e., the length d1 of the second receiving portion 38 which is occupied by the anode/cathode tabs 12 and 14, or the length d2 of the sealing portion 34. That is to say, the length d3 of the first receiving portion 36 can be relatively increased as much as the decreased length of the length d1 of the second receiving portion 38 or the length d2 of the sealing portion 34. However, in the crude cell 20 of the conventional lithium secondary battery 10, since the minimum length of anode/cathode grids 16 and 18 and the minimum length of a weld portion 19 must be secured in the anode/cathode tabs 12 and 14, there is a limitation in which the second receiving portion 38 is to be considered as a dead space in the manufacturing process of the lithium secondary battery until now.

As shown in FIG. 3, there is a strong possibility that the package member 40 is damaged by the welded portion 19 to which the grids 16 and 18 and the tab members 11 and 13 are welded, or rough and sharp portions existing in the anode/cathode tabs 12 and 14. Therefore, in the conventional lithium secondary battery 10, there is a problem in which the package member 40 can be damaged by such a welded portion 19, or portions of the electrode tabs 12 and 14, this causes short-circuit to occur, and, therefore, the battery may malfunction.

SUMMARY OF THE INVENTION

To solve the above-described problems, it is an objective of the present invention to provide a method for treating electrode tabs of a crude cell for a lithium secondary battery which has an improved structure capable of preventing short-circuit occurring when a package member is torn by electrode tabs, in particular, a sharp portion of a welded portion to which grids and tab members are welded, or the like, and capable of increasing the capacity of the battery by increasing the length of electrode plates as much as a decreased portion of the length of a dead space of an electrode tab portion, and a crude cell and a lithium secondary battery according to the method.

Accordingly, to achieve the above object, there is provided a method of treating electrode tabs of a crude cell for a lithium secondary battery including the steps of: (a) welding a tab member to one ends of grids of the crude cell; and (b) attaching insulating tape to the circumference of an electrode tab so that the insulating tape can wrap around the electrode tab which is formed by a welded portion of the grids and the tab member.

To achieve the above object, there is provided a method of treating electrode tabs of a crude cell for a lithium secondary battery including the steps of: (a) respectively, gathering anode grids and cathode grids of the crude cell provided with a plurality of anode plates having respective anode grids, a plurality of cathode plates having respective cathode grids, and a separator strip interposed between the anode plates and the cathode plates which are disposed alternately; (b) welding an anode tab member and a cathode tab to respective end portions of the anode grids and the cathode grids to form an anode side welded portion and a cathode side welded portion; and (c) attaching insulating tape to the anode side welded portion and the cathode side welded portion with an adhesive so that the insulating tape wraps around the welded portions.

To achieve the above object, there is provided a method of treating electrode tabs of a crude cell provided with a plurality of anode plates having respective anode grids, a plurality of cathode plates having respective cathode grids, and a separator strip interposed, in a fold to fold manner, between the anode plates and the cathode plates which are disposed alternately including the steps of: (a) gathering the anode grids and the cathode grids, respectively, so that the grids can be close to a first surface and be substantially parallel to the first surface, and cutting the end portions of the anode grids and the cathode grids so that the anode grids and the cathode grids can have the shortest length required for being welded to respective tab members; (b) welding an anode tab member and a cathode tab member to respective end portions of the anode grids and the cathode grids to form an anode side welded portion and a cathode side welded portion having lengths as short as possible; (c) attaching insulating tape to the anode side welded portion and the cathode side welded portion so that the insulating tape can wrap the welded portions; (d) bending the anode grids and the cathode grids at respective first bend portions so that the grids can be close to a second surface which is opposite to the first surface, and be substantially perpendicular to the second surface; and (e) bending the respective tab members at respective second bend portions so that the tab members can be close to the respective first bend portion, and be substantially parallel to the first surface.

It is preferable that in the insulating tape attaching step, the insulating tape is made of polyimide or polypropylene film having characteristics of heat-resistance and chemical inertness, and the insulating tape is attached with an acrylate-based adhesive or silicone-based adhesive.

It is preferable that the first bend portions are formed at respective positions within respective areas where the insulating tape is attached to the anode grids and the cathode grids except the areas of the welded portions.

It is preferable that each of the second bend portions are formed at a position which is at least farther than the welded portion from the first bend portion, and is positioned within the portion of the tab member to which the insulating tape is attached.

It is preferable that in the first bend portion and the second bend portion may be formed at positions which are substantially close to both sides of the insulating tape.

It is preferable that (a) the separator is provided with a single-layered or multi-layered porous polymer film made of polyethylene or polypropylene, has the form of a single strip, and is multiply folded in a fold to fold fashion so that the anode plates and the cathode plates can be stacked alternately; (b) the anode plates having the same predetermined size are equidistantly attached to one surface of the separator with an ion conductive polymer adhesive; and (c) the cathode plates having the same predetermined size are attached to the other surface of the separator at positions corresponding to the anode plates with an ion conductive polymer adhesive.

It is preferable that the circumferential surface of the crude cell formed in a fold to fold configuration is wrapped with wrapping tape.

It is preferable that in the welding step, welding is not performed at the same time at the cathode side and the anode side, and any one of two tab members is welded to corresponding grids first and the other tab member is welded to the other grids.

To achieve the above object, there is provided a lithium secondary battery including a crude cell made according to any one of the above-mentioned methods; and a package member which receives the crude cell so that any substantial dead space may not be formed at an electrode tab portion of the crude cell, and can be hermetically sealed after an electrolyte is filled into the package member.

To achieve the above object, there is provided a crude cell for a lithium secondary battery including: a plurality of anode plates having respective grids; a plurality of cathode plates having respective grids; a separator; an anode tab member and a cathode tab member; and insulating tape; wherein the anode tab member and the cathode tab member are welded to the anode grids and the cathode grids, respectively, and the welded portions are wrapped with the insulating tape.

It is preferable that at least two bend portions are formed at a grid portion and a tab member portion.

To achieve the above object, there is provided a lithium secondary battery including: a crude cell of claim; a package member for receiving the crude cell; and an electrolyte filled in the package member.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Now, a method of treating electrode tabs of a crude cell for a lithium secondary battery according to a preferred embodiment of the present invention, and a crude and a lithium secondary battery according to the method will be described in detail with reference to the attached drawings.

Figure 4:
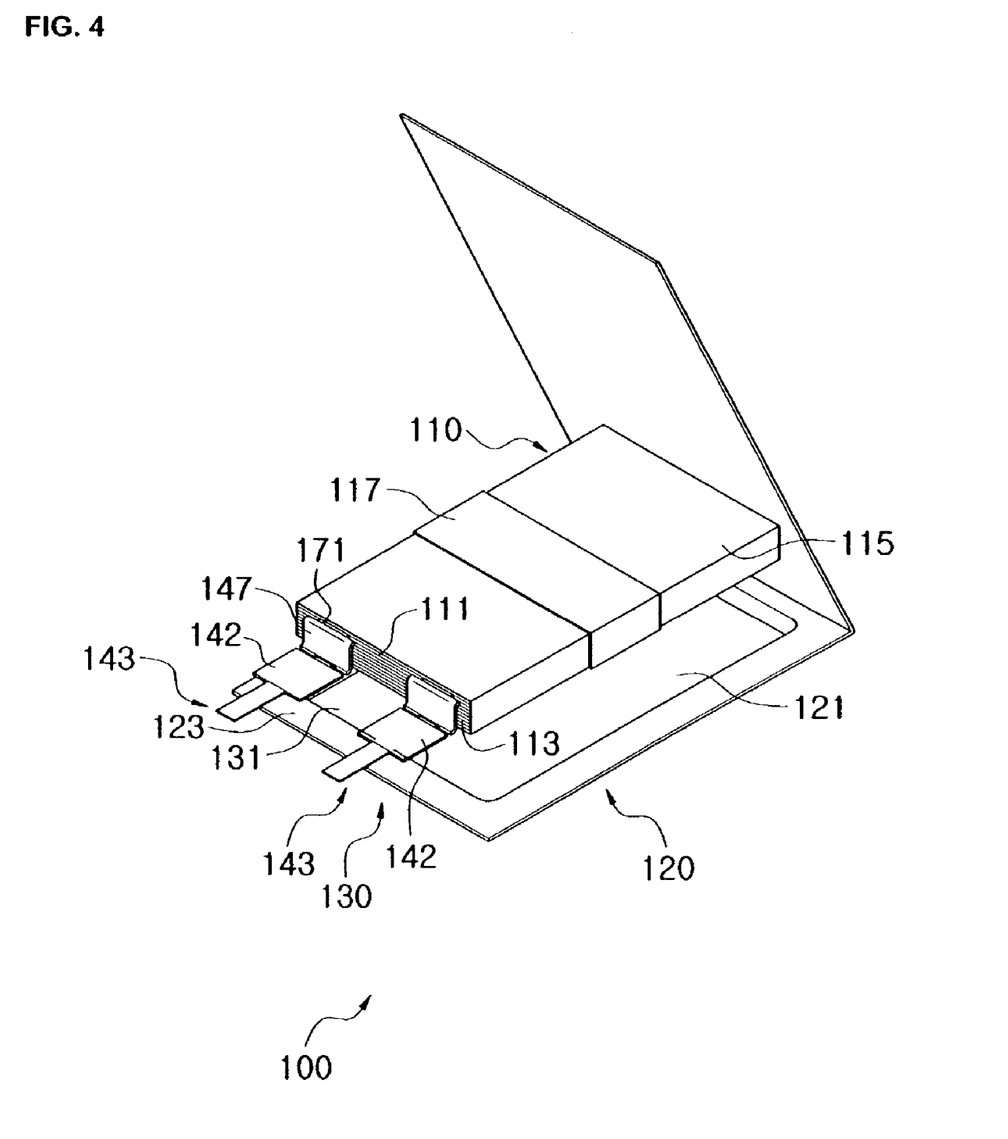
FIG. 4 is an exploded perspective view schematically illustrating a lithium secondary battery according to a preferred embodiment of the present invention.
Figure 5:
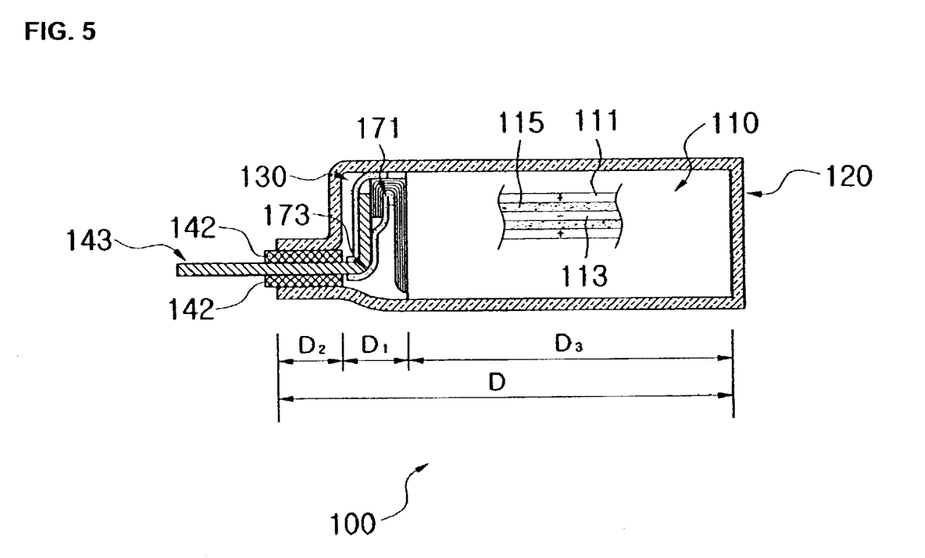
FIG. 5 is a section view of the battery of FIG. 4 in the assembled state.

FIG. 4 is an exploded perspective view schematically illustrating a lithium secondary battery according to a preferred embodiment of the present invention, and FIG. 5 is a section view of the battery of FIG. 4 in the assembled state.

Referring to FIGS. 4 and 5, a lithium secondary battery according to a preferred embodiment of the present invention is comprised of a crude cell 110 having a structure of an anode plate/a separator/a cathode plate, and a package member 120 capable of receiving the crude cell 110 and being sealed.

Theoretically, crude cell 110 may be a lithium secondary ion battery or a lithium secondary polymer battery. In addition, the crude cell 110 may be a unit cell or bi-cell, or a cell formed by stacking the unit cells or the bi-cells. Further, each electrode plate (the anode plate or the cathode plate) is comprised of a main body of an electrode plate, and a grid extending from the electrode plate.

The grids are classified into anode grids and cathode grids, and the anode grids and the cathode grids may be disposed at opposite side positions with respect to the lengthwise direction of the crude cell 110. However, in this embodiment, it is assumed that the anode grids and the cathode grids are disposed at the same side position with respect to the lengthwise direction of the crude cell 110.

In general, the crude cell 110 is distinguished from a battery 100, in itself, in which the crude cell 110 is received in the package member 120, an electrolyte is filled in the package member 120, and the package member 120 is hermetically sealed. In addition, although the term 'crude cell' is used together with the term 'battery assembly (electrode assembly)', the term 'crude cell' is used in this embodiment unless specifically stated otherwise.

Although the crude cell may have any of various structures described above, it is preferable that the crude cell 110 is manufactured by the apparatus as disclosed in Korean Patent Application No. 10-2001-28493 (Automated system for manufacturing lithium secondary battery), Korean Patent Application No. 10-2001-28494 (Lamination Apparatus for automated system for manufacturing lithium secondary battery), and Korean Patent Application No. 10-2001-28495 (Packing apparatus for automated system for manufacturing lithium secondary battery), which were filed on May 23, 2001 by the applicant of the present invention.

A schematic structure of the crude cell 110 is a laminated structure having 3 layers of an anode plate/a separator/a cathode plate, and will be described as follows.

In the crude cell 110, the anode plate 111 is made by coating a positive active material on one or both surfaces of a metal foil collector such as an aluminium foil collector, and drying the positive active material, and an anode grid is formed to be extended from a portion of the collector where the positive active material is not coated. The cathode plate 113 is made by coating a negative active material on one or both surfaces of a metal foil collector such as a copper foil collector, and drying the negative active material, and a cathode grid is formed to be extended from a portion of the collector where the negative active material is not coated. The separator 115 includes at least one porous polymer membrane of polyethylene (PE) or polypropylene (PP), and has a single-layered or multi-layered structure. The separator 115 further includes adhesive portions to which the anode plate 111 and the cathode plate 113 are attached, an insulating portion for insulating the anode plate and the cathode plate from each other, and a winding portion for winding the surface of a laminate when the laminate is finally formed with the anode/cathode plates. Here, the adhesive portion and the insulating portion are formed in sequence, and the length of the insulating portion is set to be slightly longer than that of the adhesive length. The reason is that although the adhesive portion has the same width as the width of the anode plate or the cathode plate, the insulating portion must have an additional length as much as the thickness of the anode plate or the cathode plate since the insulating portion must be folded about a side of the anode plate or the cathode plate. In addition, it is preferable that the winding portion has a sufficient length enough to wind the electrode laminate. It is preferable that an ion-conductive polymer adhesive (not shown) which is applied to the surface of the separator 115 is selected among solvent type adhesives utilizing ion-conductive polymers, for example, an styrene-butadiene rubber (SBR) latex-based adhesive, an acrylic solvent adhesive, an adhesive utilizing polyacrylonitrile (PAN), an adhesive using a blend of PAN and polyvinylidene fluoride (PVDF), an polymer adhesive using polymethyl methacrylate (PMMA), or their like. After the separator 115 is folded in a zigzag manner, more accurately in a fold to fold manner so that the anode plates and the cathode plates may alternate with each other, the folded separator 115 is taped with a given length of tape 117 for convenience of subsequent processes.

Figure 6:
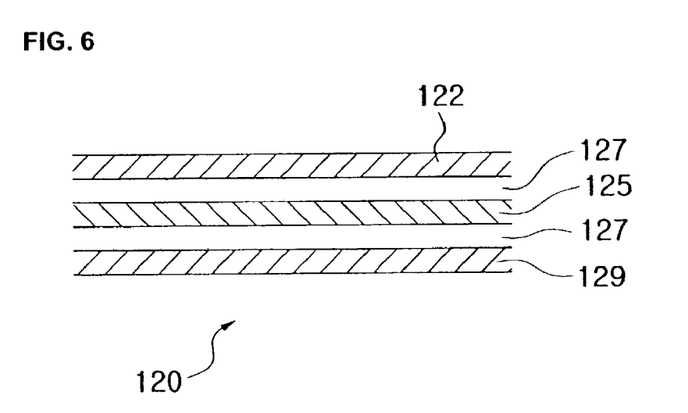
FIG. 6 is a section view schematically illustrating a structure of the package member shown in FIGS. 4 and 5.

As shown in FIGS. 4 and 5, the package member 120 comprises a first receiving portion 121 for receiving a main body of the crude cell 110, a sealing portion 123 provided around the first receiving portion 121, and a second receiving portion 131 for receiving an electrode tab 130 portion. As shown in FIG. 6, the package member 120 is made of a thin aluminium plate having a thickness of about 20~50 μm, and a polypropylene film 129 having a thickness of about 30 μm is attached with an adhesive 127 to the inner surfaces of the aluminum member 125, i.e., the surfaces for receiving the crude cell 110, and a nylon film 122 is attached with an adhesive 127 to the outer surfaces of the aluminum member 125.

As shown in FIGS. 4 and 5, when the crude cell 110 is received in the first receiving portion 121 of the package member 120, the length of the electrode plates can be lengthened while the space of the electrode tab portion is reduced on the premise that the width of the battery and the number of the electrode plates (the anode plates and the cathode plates) are the same as a conventional battery.

Referring to FIGS. 4 and 5, in the lithium secondary battery 100 according to a preferred embodiment of the present invention, since the length D1 of the second receiving portion 131 occupied by the electrode tab 130 portion is reduced less than the length d1 of that of a conventional battery, the length D3 of the first receiving portion 121 can be longer than the length d3 of that of the conventional battery. Consequently, the unnecessary dead space can be reduced and the capacity of the battery can be increased. As a matter of course, the thickness T of the battery, i.e., the number of the electrode plates, and the width W of the battery have constant values since the specification of a battery is predetermined by requirements of electronic appliances which use the battery.

Now, separate processes of a method of treating electrode tabs of a crude cell for a lithium secondary battery will be described as follows.

Figure 7A:
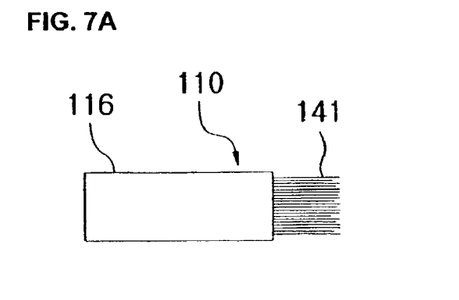
FIGS. 7A through 7H are process diagrams conceptually illustrating a method of treating electrode tabs according to a preferred embodiment of the present invention.
Figure 7B:
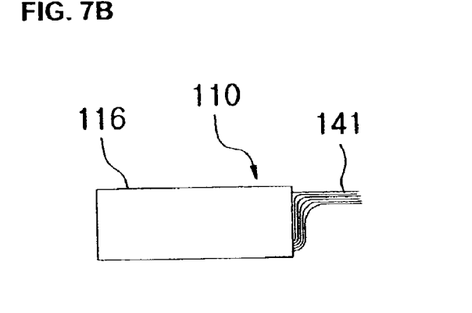
Figure 7C:
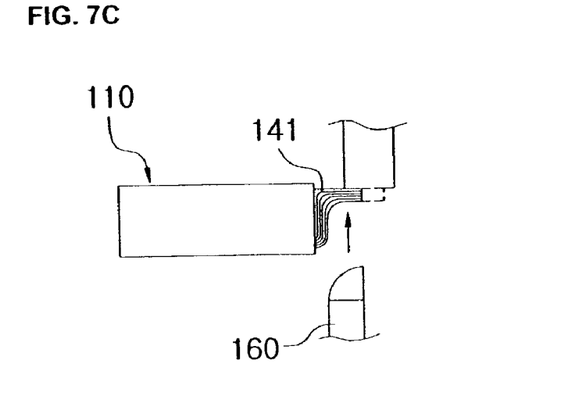
Figure 7D:
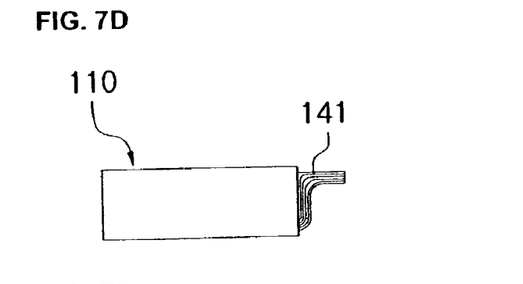
Figure 7E:
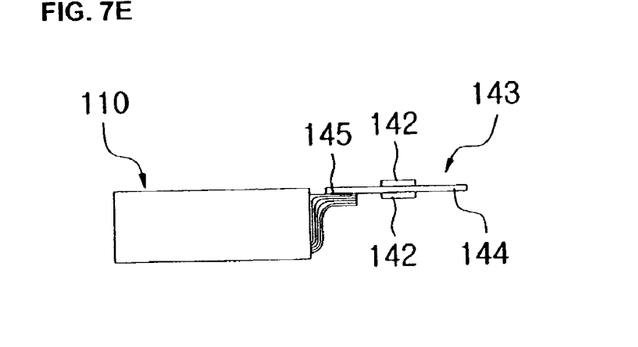
Figure 7F:
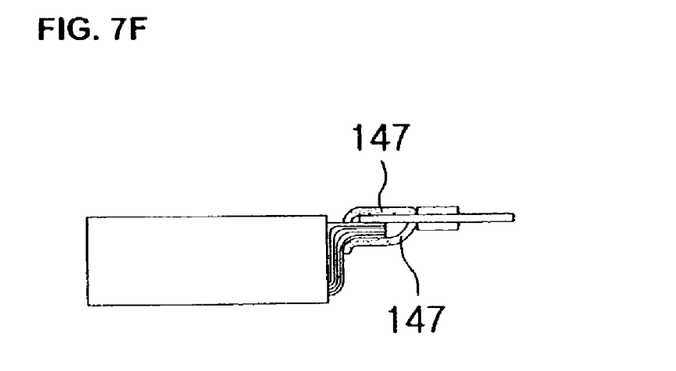
Figure 7G:
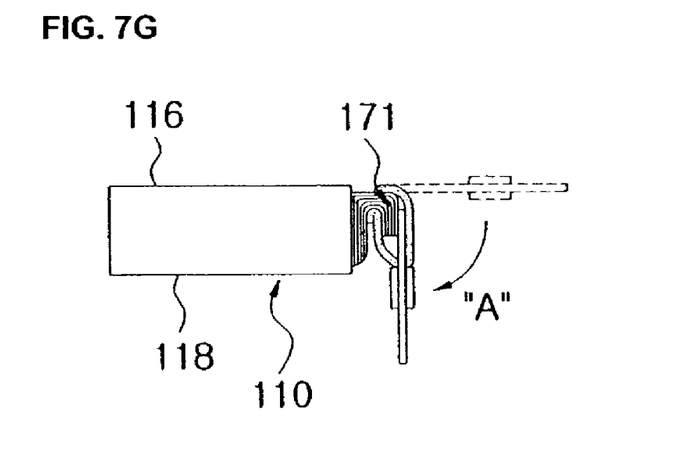
Figure 7H:
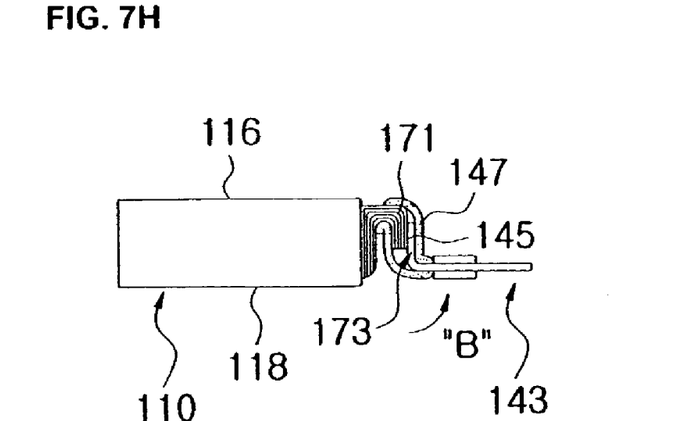
Figure 8:
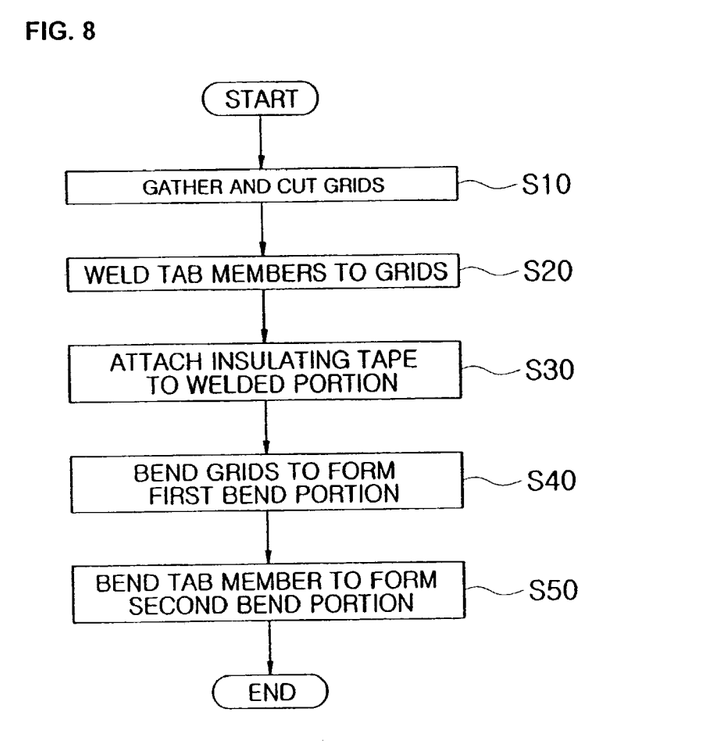
FIG. 8 is a flowchart illustrating the steps of the method of treating electrode tabs of a crude cell for a lithium secondary battery according to a preferred embodiment of the present invention.

FIGS. 7A through 7H are process diagrams conceptually illustrating a method of treating electrode tabs according to a preferred embodiment of the present invention, and FIG. 8 is a flowchart illustrating the steps of the method.

In the following descriptions of the steps of this embodiment, the members related to anode and cathode plates such as grids, tabs, or the like are generally described without specifying their polarity. Therefore, such members whose polarity is not specified denote both anode members and cathode members unless specifically stated otherwise. As a matter of course, in a specific process, it should be understood that members having any one polarity may be processed first, and then members having the other polarity may be processed.

Referring to FIGS. 7A through 7H and FIG. 8, a method of treating electrode tabs according to a preferred embodiment of the present invention includes the steps of gathering and cutting grids 141 of a crude cell 110 (S10), welding the grids 141 to a tab member 143 (S20), attaching an insulating tape 147 to a welded portion 145 (S30), bending the grids 141 to form a first bend portion (S40), and bending the tab member 143 to form a second bend portion (S50).

First, in the step S10, the grids 141 are gathered so that the end portions of the grids 141 may be close to a first surface 116 of the crude cell 110, and be substantially parallel to the first surface 116. Then, the end portions of the grids 141 are cut.

As shown in FIG. 7A, generally, the grids 141 of the crude cell 110 are disposed to be substantially parallel to the direction of electrode plates (anode plates or cathode plates), or are randomly scattered. Therefore, in order to weld such grids 141 to the tab member 143 at one position, it is necessary to gather and arrange the grids 143. In addition, in order to minimize the dead space, it is necessary that the grids 141 are cut to have a minimum length.

Figure 9:
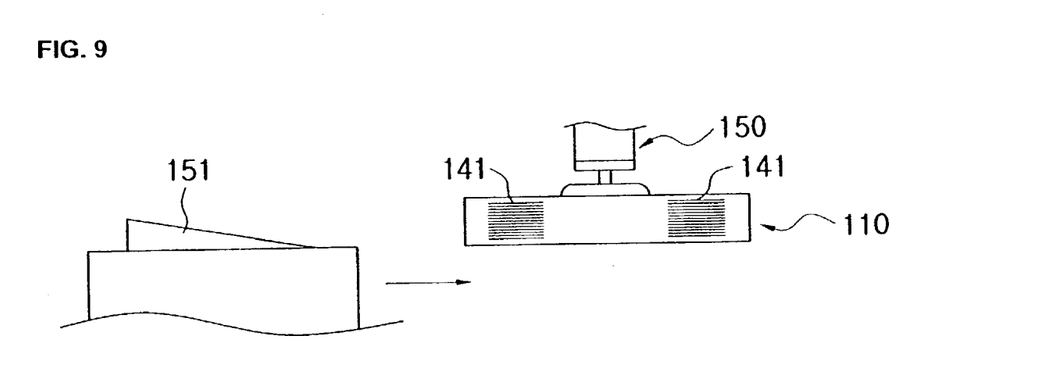
FIG. 9 is a process diagram illustrating a process of gathering grids of a crude cell toward a position, in the step of gathering and cutting grids in FIG. 8.

In the step S10, as shown in FIG. 9, when a slope 151 is moved to contact the grids 141 while the crude cell 110 shown in FIG. 7A is fixed by a jig 150, the grids 141 are pushed to the direction of the first surface 116 of the crude cell 110, and are gathered to be substantially parallel to the first surface 116, as shown in FIG. 7B. Subsequently, as shown in FIG. 7C, when a cutter 160 having a predetermined shape is raised while the crude cell is fixed, unnecessary portions of the end portions of the grids 141 are cut away, and the end portions of the grids 141 are gathered more compactly, as shown in FIG. 7D.

Thereafter, in the step S20, the tab member 143 comprising a resin portion 142 and a non-resin portion 144 is welded to the grids 141 of the crude cell 110 shown in FIG. 7D, and laser welding, ultrasonic welding, spot welding or the like is mainly used in this embodiment. Usually, the width of the tab member 143 is wider than that of the grids 141. Therefore, although welding may be performed with the tab member 143 disposed under the grids 141, it is preferable that welding is performed with the tab member 143 disposed on the grids 141. The length of a welded portion 145 formed by welding the grids 141 to the end portion of the non-resin portion 144 of the tab member 143 is in a range of about 1.0 through 2.5 mm. As a matter of course, although welding can be performed so that the length of the welded portion 145 may be shorter than a minimum length of the range, the possibility of welding defects increases. To the contrary, when the length of the welded portion 145 is longer than a maximum length of the range, it is undesirable that the unnecessary dead space and material cost increase.

Figure 10:
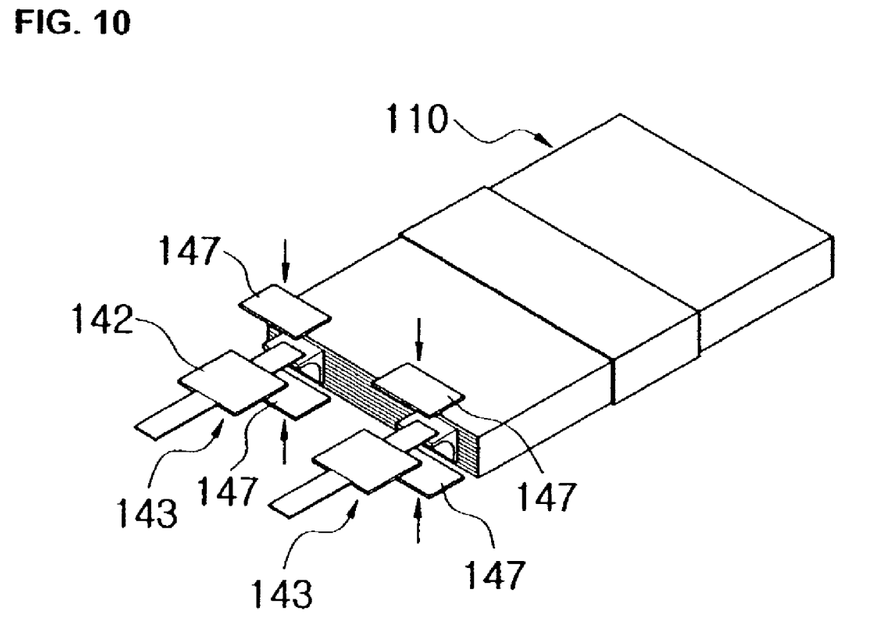
FIG. 10 is a perspective view illustrating the step of attaching insulating tape to a welded portion with an adhesive.

Thereafter, in the step S30, as shown in FIG. 7F and FIG. 10, the welded portion is wrapped with tape so that metal (aluminum) portions 127 (FIG. 6) of the package member 120 can be prevented from being damaged by the grids 141 or the tab member 143, and therefore the battery 100 can be prevented from being short-circuited. Insulating tape 147 is attached with an adhesive (not shown) to the upper and lower surfaces of the welded portion 145. Here, it is preferable that the insulating tape 147 is made of polyimide or polypropylene film having characteristics of heat-resistance and chemical inertness. In addition, it is preferable that an acrylate-based adhesive or a silicone-based adhesive is used as an adhesive for attaching the insulating tape 147 to the welded portion 145. It is preferable that dimensions of the insulating tape 147 attached to the upper and lower surfaces of the welded portion 145 are sufficiently extended in the lengthwise direction of the grids 141 and the tab member 143 and in the widthwise direction of the grids 141 with reference to the center of the welded portion 145.

Figure 11:
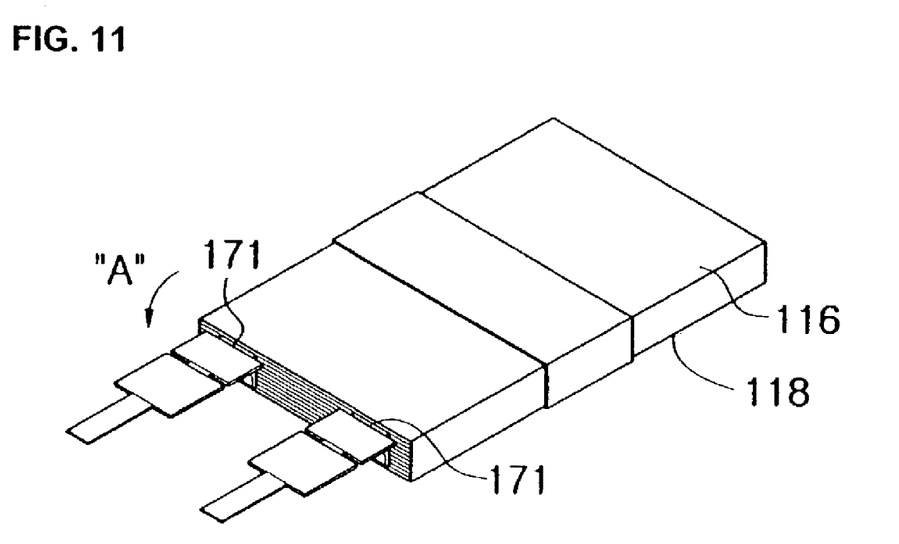
FIG. 11 is a perspective view illustrating the step of forming a first bend portion in FIG. 8.

Subsequently, in the step S40, as shown in FIGS. 7G and FIG. 11, the grids 141 are bent at a first bend portion 171 in the direction of arrow A in FIG. 11 so that the grids 141 may be close to a second surface 118 which is opposite to the first surface 116 of the crude cell 110, and may be perpendicular to the second surface 118. Here, it is not preferable that the first bend portion 171 is formed at the welded portion 145. In addition, although the first bend portion 171 may be formed at a portion of the grids 141 to which the insulating tape is not attached, it is preferable that the first bend portion 171 is formed at the portion of the grids 141 to which the insulating tape 147 is attached. This is intended to maintain the first bend portion 171 in the bent shape by using the dimensionally stable insulating tape 147 since the grids 141 may have a property of restoration to its original shape, and may exhibit a tendency to be straightened. In addition, when the grids 141 are bent together with the insulating tape 147, the strength of the grids 141 can be maintained at the bent portion. For example, in a battery employing mesh type grids, although the grids suffer damage at the first bend portion 171, there is an advantage in which the insulating tape 147 can protect the grids 141 from damage.

Figure 12:
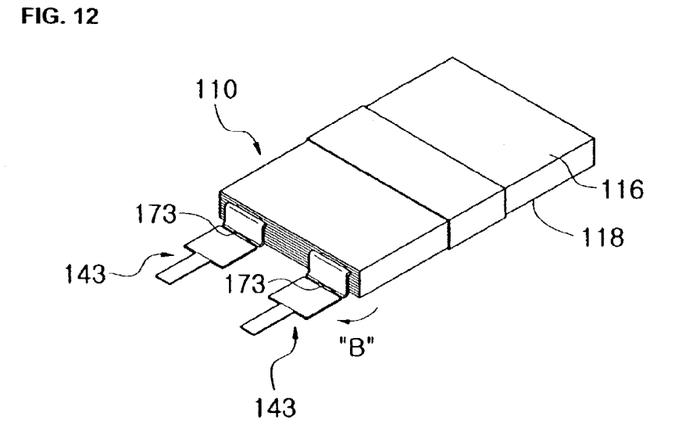
FIG. 12 is a perspective view illustrating the step of forming a second bend portion in FIG. 8.

Subsequently, in step S50, as shown in FIGS. 7H and FIG. 12, the tab member 143 is bent at the second bend portion 173 in the direction of arrow B so that the tab member 143 may be close to the first bend portion 171 and may be substantially parallel to the first surface 116. It is not preferable that the second bend portion 173 is formed at the welded portion 145, and it is preferable that the second bend portion 173 is formed at a position which is at least farther than the welded portion 145 from the first bend portion 171, and is positioned within the portion of the tab member 143 to which the insulating tape 147 is attached. The reason is that, as described above, the bent portions can be maintained in a stable state, the strength of the tab member 143 and the welded portion 145 can not be degraded, and the bend portions 171 and 173 and the welded portion 145 can be protected from damage. In addition, it is preferable that the distance between the first bend portion 171 and the second bend portions 173 is adjusted to be appropriate for the number of stacked electrode plates of the crude cell 110 (the thickness of the crude cell 110). That is, it is preferable that when the number of stacked electrode plates is relatively large, the distance is set to be correspondingly long, and when the number of stacked electrode plates is relatively small, the distance is set to be correspondingly short.

On the contrary, the first bend portion 171 and the second bend portion 173 may be formed at positions which are substantially close to both sides of the insulating tape 147. That is, the first bend portion 171 may be formed at a position within the portion composed of the grids 141 only, and the second bend portion 173 may be formed at a position within the portion composed of the tab member 143 only so that the insulating tape 147 may not be bent.

Referring to FIGS. 4 and 5 again, since the lithium secondary battery 100 of the preferred embodiment of the present invention is manufactured by the above-described method of treating electrode tabs of a crude cell, the welded portion of the tab member 143 to the grids 141 can be protected by the insulating tape 147, and since the first bend portion 171 and the second bend portion 173 are formed at portions to which the insulating tape 147 are attached, the bent configuration of the bent portions can be more stably fixed, and the grids 141 and the tab member 143 can be protected from damage.

Figure 13:
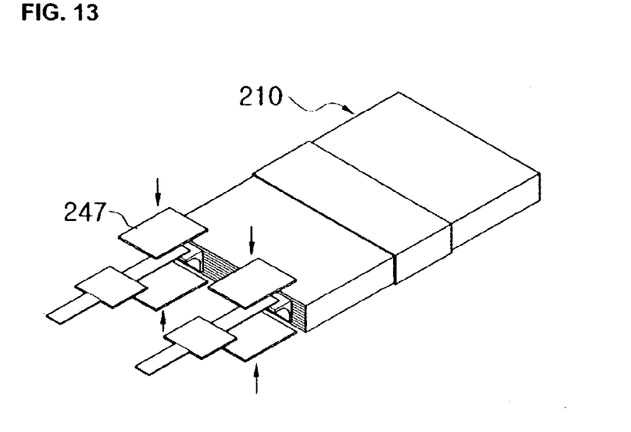
FIGS. 13 through 15 are process diagrams schematically illustrating the steps of a method of treating electrode tabs of a crude cell for a lithium secondary battery according to another embodiment of the present invention.
Figure 14:
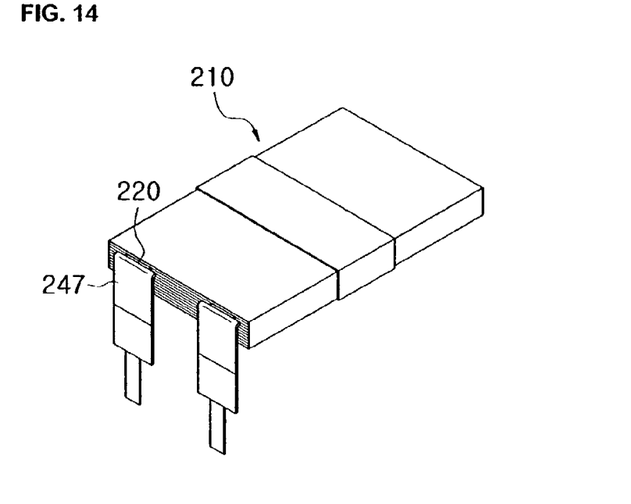
Figure 15:
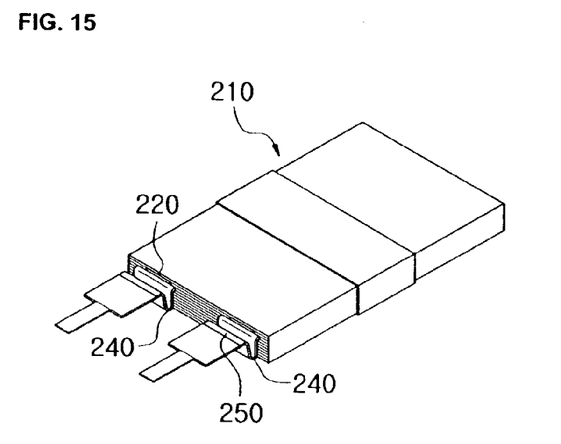
Figure 16:
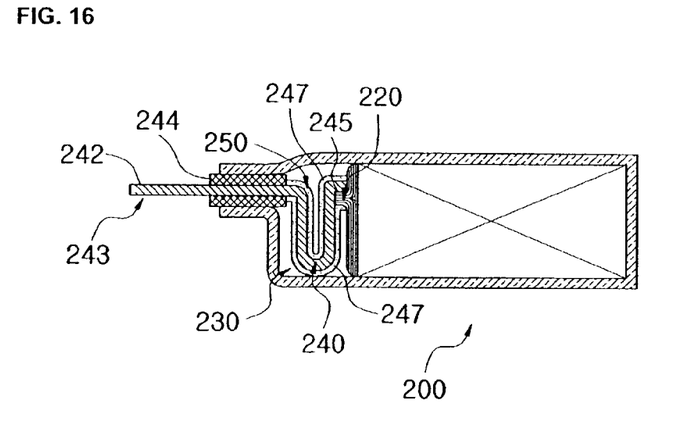
FIG. 16 is a schematic section view of a lithium secondary battery employing the crude cell shown in FIG. 15.

FIGS. 13 through 15 are process diagrams schematically illustrating the steps of a method of treating electrode tabs of a crude cell for a lithium secondary battery according to another embodiment of the present invention, and FIG. 16 is a schematic section view of a lithium secondary battery employing the crude cell shown in FIG. 15.

A method of treating electrode tabs of a crude cell 210 for a lithium secondary battery according to this embodiment further includes the step of forming a third bend portion 250 in addition to a first bend portion 220 and a second bend portion 240.

Although such a third bend portion 250 are necessary for various reasons, the third bend portion 250 is mainly intended to flexibly meet different processing conditions due to variations in the length of a welded portion 245, for example, a longer length of the welded portion 245, and variations in the thickness of a battery determined by the number of stacked electrode plates (anode plates and cathode plates). As a matter of course, in this embodiment, the number of processing steps increases correspondingly. As shown in FIGS. 13 and 14, it is preferable that a non-resin portion 242 of a tab member 243 is set to be relatively longer, and, as shown in FIG. 16, the tab member 243 is bent together with insulating tape 247 at the third bend portion 250. To this end, the insulating tape 247 having a length longer than that of the insulating tape 147 of the previous embodiment is used.

Figure 17:
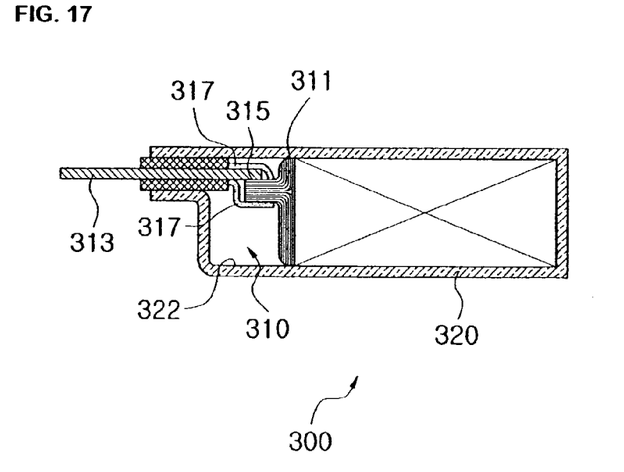
FIG. 17 is a schematic section view illustrating a structure of a lithium secondary battery employing a crude cell according to still another embodiment of the present invention.

FIG. 17 is a schematic section view illustrating a structure of a lithium secondary battery employing a crude cell according to still another embodiment of the present invention.

Referring to FIG. 17, a crude cell 310 according to this embodiment has a structure in which after grids 311 are gathered and are welded to a tab member 313 to form a welded portion 315, insulating tape 317 is attached to the circumference of the welded portion 315 without forming any bent portion. When such a crude cell 310 is received in a receiving portion 322 of a package member 320, a liquid electrolyte (not shown) is filled into the receiving portion 322, and then the package member 320 is hermetically sealed, the manufacture of a lithium secondary battery is completed.

Here, since the welding step and the insulating tape attaching step have been described above, detailed descriptions concerning those steps are omitted. In addition, the crude cell 310 may be a unit cell or bi-cell, or a cell formed by stacking the unit cells or the bi-cells. The lithium secondary battery 300 according to this embodiment is not related to a decrease of the dead space, and is intended to prevent a short circuit from being formed.

As described above, the method of treating electrode tabs of a crude cell for a lithium secondary battery according to the present invention, and the crude cell and the battery according to the method have the following effects.

First, since the circumferences of welded portions formed by welding tab members to grids of the lithium secondary battery are insulated by attaching insulating tape and, accordingly, the battery is prevented from forming a short circuit due to a sharp portion around welded portions or a foreign material from a welding defect or the like, safety and reliability of the battery can be enhanced.

Second, since the electrode tabs including the welded portions formed by welding the tab members to the grids of the lithium secondary battery are bent and disposed to be nearly parallel to a section of the battery, the dead space can be reduced to be smaller than that of a conventional battery, and since the length of the electrode plates can be lengthened as much as the reduced dead space, there is an effect that the capacity of the battery can be increased when the battery is compared to a conventional battery having the same dimensional specifications.

Third, since the grids or the tab members are bent together with the dimensionally stable insulating tape in the steps of bending the electrode tabs, the strength of the bent portions can be enhanced, and there is an effect in which the bent portions are prevented from being damaged when the portions are being bent.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of treating electrode tabs of a crude cell provided with a plurality of anode plates having a plurality of respective anode grids, a plurality of cathode plates having a plurality of respective cathode grids, and a separator strip interposed, in a fold to fold manner, between said anode plates and said cathode plates which are disposed alternately including the steps of:

(a) gathering said anode grids and said cathode grids, respectively, so that the grids are proximate or substantially parallel to a first surface;

(b) cutting an end portion of said anode grids and said cathode grids so that said anode grids and said cathode grids are of the shortest length required for being welded to a plurality of respective tab members;

(c) welding an anode tab member and a cathode tab member to respective said end portions of said anode grids and said cathode grids to form an anode side welded portion and a cathode side welded portion;

(d) attaching an insulating tape to said anode side welded portion and said cathode side welded portion so that said insulating tape can wrap said welded portions;

(e) bending said anode grids and said cathode grids at a plurality of respective first bend portions so that said grids can be close to a second surface which is opposite to said first surface, and be substantially perpendicular to said second surface; and (f) bending said respective tab members at a plurality of respective second bend portions so that said tab members can be close to said respective first bend portion, and be substantially parallel to said first surface.

2. The method as claimed in claim 1, wherein said insulating tape is a polyimide or a polypropylene film having characteristics of heat-resistance and chemical inertness, and said insulating tape is attached with an acrylate-based adhesive or a silicone-based adhesive.

3. The method as claimed in claim 1, wherein said first bend portions are formed at a plurality of respective positions where said insulating tape is attached to said anode grids and said cathode grids except the areas of said welded portions.

4. The method as claimed in claim 1, wherein each of said second bend portions are formed at a position which is at least farther than said welded portion from said first bend portion, and said second bend portions are positioned within the portion of said tab member to which said insulating tape is attached.

5. The method as claimed in claim 1, wherein said first bend portion and said second bend portion may be formed at positions which are substantially close to both sides of said insulating tape.

6. The method as claimed in claim 1, wherein:

(a) said separator is a single strip of a single-layered or a multi-layered porous polymer film made of a polyethylene or a polypropylene, and is multiply folded in a fold-to-fold fashion so that said anode plates and said cathode plates can be stacked alternately;

(b) said anode plates have the same predetermined size and are attached to a first surface of said separator with an ion conductive polymer adhesive; and (c) said cathode plates have the same predetermined size and are attached to a second surface of said separator at positions corresponding to said anode plates with said ion conductive polymer adhesive.

7. The method as claimed in claim 6, wherein the circumferential surface of said crude cell formed in said fold to fold fashion is wrapped with a wrapping tape.

8. The method as claimed in claim 1, wherein in said welding step, said welding is not performed at the same time on the cathode side and the anode side, and a first of two said tab members is welded to corresponding said grids first, and then a second of two said tab members is welded to the other of said grids.

* * * * *